United States Patent [19]
Di Giacomo et al.

[11] Patent Number: 5,601,310
[45] Date of Patent: Feb. 11, 1997

[54] HYBRID INFLATOR AND METHOD OF USE

[75] Inventors: Michael Di Giacomo, Warrenton; Robert S. Scheffee, Lorton, both of Va.

[73] Assignee: Atlantic Research Corporation, Gainesville, Va.

[21] Appl. No.: 530,047

[22] Filed: Sep. 19, 1995

[51] Int. Cl.$^6$ ............................................. B60R 21/28
[52] U.S. Cl. ............................... 280/741; 280/736; 222/3
[58] Field of Search .......................... 280/741, 736, 280/737, 728.1; 102/530, 202, 202.14; 222/3, 5

[56] References Cited

U.S. PATENT DOCUMENTS

| | | | |
|---|---|---|---|
| 3,618,974 | 11/1971 | Chute | 280/741 |
| 3,785,674 | 1/1974 | Poole et al. | 280/741 |
| 3,817,263 | 6/1974 | Bendler et al. | 137/68.13 |
| 3,928,964 | 12/1975 | Hamilton | 60/219 |
| 5,031,932 | 7/1991 | Frantom et al. | 280/741 |
| 5,033,772 | 7/1991 | Frautom et al. | 280/737 |
| 5,060,973 | 10/1991 | Giovanetti | 280/736 |
| 5,076,607 | 12/1991 | Woods et al. | 280/737 |
| 5,199,740 | 4/1993 | Frantom et al. | 280/736 |
| 5,257,819 | 11/1993 | Frantom et al. | 280/737 |
| 5,342,089 | 8/1994 | Fink et al. | 280/731 |
| 5,345,876 | 9/1994 | Rose et al. | 102/531 |
| 5,351,988 | 10/1994 | Bishop et al. | 280/737 |
| 5,415,845 | 5/1995 | Brede et al. | 422/305 |
| 5,441,302 | 8/1995 | Johnson et al. | 280/236 |
| 5,470,104 | 11/1995 | Smith et al. | 280/737 |
| 5,487,561 | 1/1996 | Maudzy et al. | 280/741 |
| 5,496,062 | 3/1996 | Ruik et al. | 280/741 X |
| 5,531,423 | 7/1996 | Ruik et al. | 280/737 |

*Primary Examiner*—Christopher P. Ellis
*Attorney, Agent, or Firm*—Lowe, Price, LeBlanc & Becker

[57] ABSTRACT

A hybrid inflator and method of inflating airbags include a pressure vessel which utilizes a solid propellant, a liquid fuel and a compressed oxidizing gas to produce an inflator gas for inflating devices such as airbags. The solid propellant vaporizes and superheats the liquid fuel, thus raising it above its autoignition temperature. When put in contact with the compressed oxidizing gas the liquid fuel ignites. The thus-ignited liquid fuel and compressed gas rupture a burst disk in the inflator to release the inflator gas for inflation purposes.

15 Claims, 1 Drawing Sheet

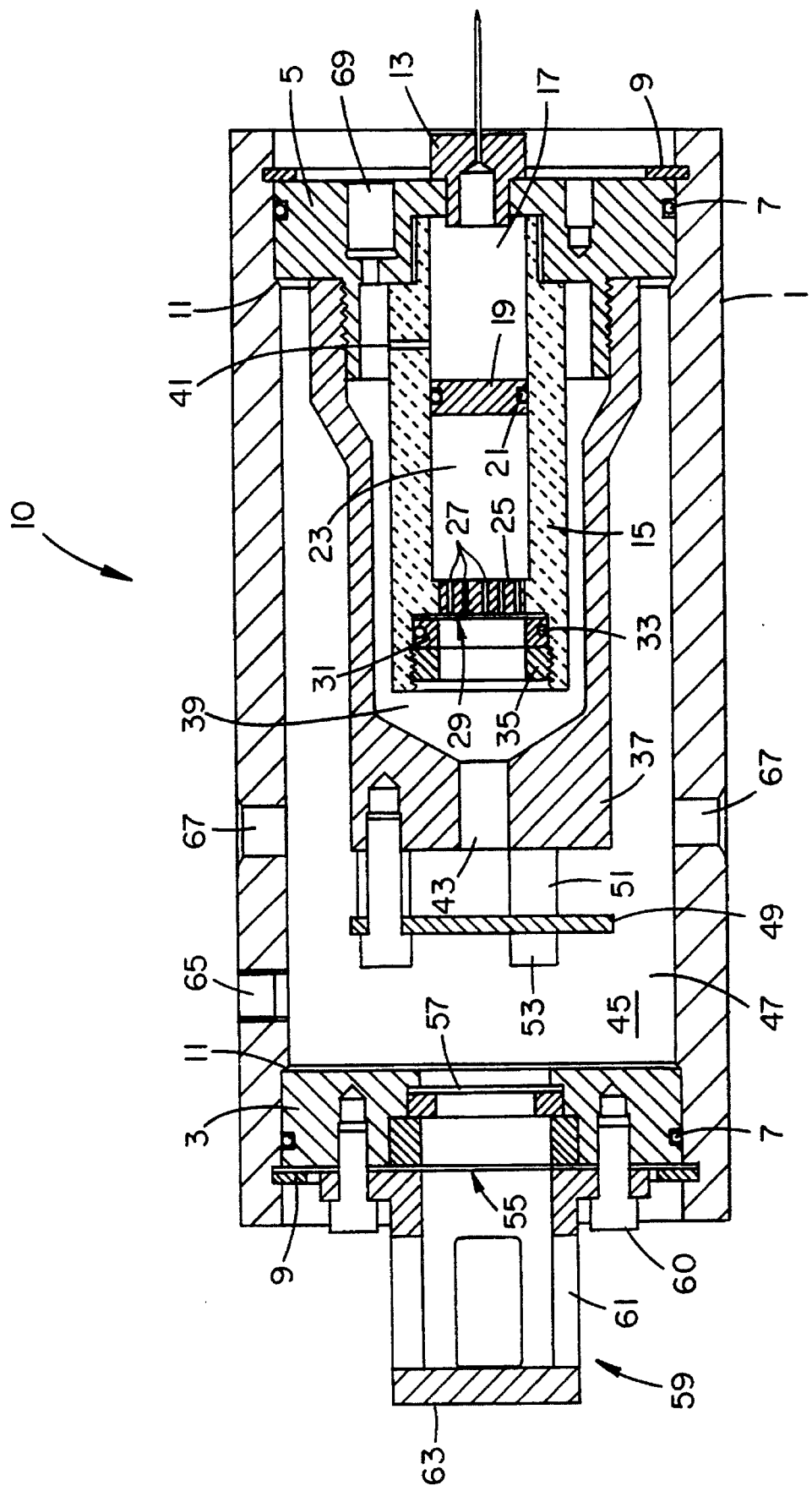

HYBRID INFLATOR AND METHOD OF USE

FIELD OF THE INVENTION

The present invention is directed to a hybrid inflator which utilizes a liquid fuel, a solid propellant and a compressed gas oxidizer to inflate a device such as an airbag.

BACKGROUND ART

The use of hybrid inflators for the inflation of air bags in automobiles is well known. Typically, a hybrid inflator includes a rupturable burst disk which releases a flow of gas from a pressure vessel in which the gas is stored to an airbag for inflation thereof. Rupture of the burst disk is responsive to a sensed vehicle condition such as a collision.

In certain hybrid inflators, an igniter assembly is provided which, when actuated, ignites a body of solid pyrotechnic material. The ignited pyrotechnic material heats and pressurizes a stored inflator gas. The heated and pressurized stored inflator gas is then released for airbag inflation by rupture of the burst disk.

One of the drawbacks of these types of hybrid inflators is the generation of solid particulates in the effluent gas which is derived from the solid propellant. The solid particulates can adversely affect the inflator performance by burning a hole in the airbag during its inflation. One reason for the excessive levels of solid particulates is that the solid propellant used in prior art inflators uses a combination of combustible and non-combustible material. When a solid propellant is ignited, only the combustible material burns and generates gaseous products of combustion. The non-combustible materials or solid particulates are carried along in the gases during the inflator operation. The use of solid propellant in inflators also increases the size and weight of inflators due to the use of non-combustible material in the solid propellant. Solid propellant-using prior art inflators also fail to provide flexibility in inflator performance since the solid propellants are not readily adaptable to different inflator performance needs.

In view of the drawbacks of these prior art hybrid inflators, a need has developed to provide an improved hybrid inflator which reduces solid particulate levels in the effluent gas when inflating airbags and also provides increased flexibility in inflator performance. In addition, a need has developed to provide inflator designs which are lighter in weight, simpler in design and lower in manufacturing costs.

In response to these needs, the present invention provides a hybrid inflator which utilizes a liquid fuel in combination with a solid propellant and a compressed inflator gas.

SUMMARY OF THE INVENTION

Accordingly, it is a first object of the present invention to provide an improved hybrid inflator, particularly for airbag inflation.

Another object of the present invention is to provided a method of inflating airbags.

A further object of the present invention is to provide a method of airbag inflation and a hybrid inflator which utilizes a liquid fuel in conjunction with a compressed inflator gas and a solid propellant for airbag inflation.

Other objects and advantages of the present invention will become apparent as a description thereof proceeds.

In satisfaction of the foregoing objects and advantages, the present invention provides a hybrid inflator and a method of inflating airbags. The hybrid inflator comprises, in its broadest embodiment, a pressure vessel forming a chamber with an igniter mounted to the pressure vessel. A solid propellant is contained within the pressure vessel so as to be ignited by the igniter. Also provided in the chamber of the pressure vessel is liquid fuel which is stored in a manner to be pressurized by ignition of the solid propellant. A first mixing chamber within the pressure vessel receives the liquid fuel when it is pressurized and mixes it with products of combustion from the solid propellant. The products of combustion vaporize, superheat and may also partially ignite the liquid fuel in the first mixing chamber.

A second chamber is provided within the pressure vessel which stores a compressed oxidizing gas such as air. The second chamber is in communication with the first mixing chamber so that the vaporized and superheated liquid fuel is ignited when contacting the compressed oxidizing gas. The liquid fuel ignites since it is at a temperature above its autoignition temperature due to its heating by the solid propellant.

The pressure vessel includes a burst disk-containing outlet which releases the gases within the second chamber.

More preferably, the solid propellant and liquid fuel are stored in an ignition container within the pressure vessel, each fuel separated by a piston. The piston is driven by ignition of the solid propellant so as to pressurize the liquid fuel. The liquid fuel, when pressurized, can pass through an injector plate which converts the liquid fuel to liquid fuel jets before mixing with the products of combustion of the solid propellant. The ignition container can also contain a rupturable burst disk at an outlet thereof, the burst disk rupturing when the liquid fuel is sufficiently pressurized by the driven piston.

A stagnation plate can be arranged at the outlet of the first mixing chamber to improve mixing and flame holding of the liquid fuel and products of combustion mixture prior to complete mixing with the compressed gas.

In another aspect of the invention, a method of inflating an inflatable device such as an airbag comprises the steps of providing an igniter, a solid propellant, a liquid fuel and a compressed oxidizing gas in a pressure vessel. The solid propellant is first ignited by the igniter, ignition thereof pressurizing the liquid fuel. The liquid fuel, driven by the solid propellant combustion, mixes with solid propellant products of combustion so as to vaporize and superheat the liquid fuel. The vaporized and superheated liquid fuel is then mixed with the compressed oxidizing gas. Since the liquid fuel is above its autoignition temperature as a result of the solid propellant combustion, the liquid fuel ignites, thus forming an inflator gas. The inflator gas is then released from the pressure vessel for inflating the inflatable device. Preferably, the liquid fuel is a liquid hydrocarbon fuel and, more preferably, methanol. The compressed oxidizing gas is preferably air.

In a preferred embodiment, the liquid fuel is pressurized into liquid jets by means of an injector plate or the like prior to mixing with the products of combustion of the solid propellant. The liquid fuel pressurization may be assisted by the presence of a burst disk which releases the liquid fuel for mixing with the solid propellant products of combustion at a given pressure.

BRIEF DESCRIPTION OF THE DRAWINGS

Reference is now made to the drawing of the invention wherein the sole FIGURE depicts an exemplary inflator in longitudinal cross section.

DESCRIPTION OF THE PREFERRED EMBODIMENTS

The inventive hybrid inflator and method of inflating devices such as airbags offers improvements in the areas of solid particulate emissions and flexibility and also reduces inflator size and weight. According to the invention, a liquid fuel, preferably a liquid hydrocarbon fuel such as methanol, is combined with a solid propellant and a compressed oxidizing gas such as air to produce an inflator gas to inflate a given device. Use of the liquid fuel results in weight savings since all of the liquid fuel is ignited during operation of the inflator. This contrasts with prior art devices which use solid propellants and require non-combustible material which increases the size and weight of the inflator. Use of a liquid fuel also provides flexibility in the inflator performance since different types of liquid fuels with varying BTU values can be utilized depending on the desired characteristics of the inflator. Since the liquid fuel is significantly less in mass than a solid propellant, the overall inflator size and weight is also reduced, these reductions contributing to lowered manufacturing costs.

It should be understood that the term "liquid fuel" means a fuel that is typically liquid at atmospheric conditions. The liquid fuel intended for the invention is not intended to encompass liquified gases which are normally at much higher pressures than atmospheric. Any liquid fuel is believed to be adaptable for the present invention. Preferably, the liquid fuel is a hydrocarbon type and, more preferably, methanol.

According to the method aspect of the invention, inflation of an inflatable device such as an airbag is achieved by first providing an igniter or squib as is well known in the art. In combination with this igniter is a charge of a pyrotechnic material or solid propellant such as Arcite 497L. The solid propellant is well known in the art and no further description is deemed necessary for understanding of the invention. Of course, any known solid propellant could be used in conjunction with the invention.

A liquid fuel and a compressed oxidizing gas are also provided, each of the aforementioned components arranged in or in conjunction with a pressure vessel having an outlet for release of the thus-produced inflator gas.

According to the invention, the solid propellant is first ignited by the igniter. Ignition of the solid propellant then pressurizes the liquid fuel and drives it from its storage chamber so as to mix with products of combustion generated by the ignition of the solid propellant. The hot products of combustion vaporize and superheat the liquid fuel. Given the high temperature of the products of combustion, a partial ignition of the liquid fuel may also occur. However, since there are no oxidants in the solid propellant, ignition of the liquid fuel is delayed until mixing with the compressed oxidizing gas. The vaporized and superheated liquid fuel and products of combustion are then mixed with the compressed oxidizing gas. The oxidizing component of the gas that is preferably air combines with the vaporized and superheated liquid fuel to ignite it and produce a rapid increase in pressure in the pressure vessel. This increase in pressure causes the thus formed inflator gas to be released from the pressure vessel to inflate the desired inflatable device.

In conjunction with pressurizing of the liquid fuel, in a preferred aspect of the method, an ignition container is provided which houses the solid propellant and liquid fuel. The solid propellant and liquid fuel are separated by a piston. Further, the ignition container includes an injector plate downstream of the liquid fuel. Ignition of the solid propellant drives the piston within the ignition container to pressurize and force the liquid fuel through the injector plate. The injector plate comprises a plurality of orifices which transform the liquid fuel into a plurality of liquid jets. These liquid jets then impinge upon a burst disk at the outlet of the ignition container, the burst disk releasing at a designated pressure. Release of the pressurized liquid fuel jets causes mixing with products of combustion of the solid propellant which exit the ignition container via radial ports therein.

The products of combustion of the solid propellant and liquid fuel jets then mix to vaporize and superheat the liquid fuel prior to mixing with the compressed oxidizing gas. The mixed products of combustion and liquid fuel can be diverted using a stagnation plate or other type of diverter prior to mixing with the compressed oxidizing gas. This diverting action assists in complete mixing of the products of combustion and liquid fuel prior to the liquid fuel ignition when contacting the oxidizing gas.

In a preferred embodiment, the solid propellant charge weighs about 3.5 grams and is initiated by a SARC 1000 Squib. 6.5 grams of methanol are provided and the compressed oxidizing gas is at a pressure of approximately 3,000 psi. Of course, other values for the solid propellant charge, liquid fuel and compressed gas pressures can be utilized depending on the desired inflator performance. For example, the compressed oxidizing gas pressure can vary from 500 to 5,000 psi with the solid propellant and liquid fuel charges varying depending on their fuel values.

The weight of 6.5 grams of methanol contrasts with weights 5 to 6 times this amount e.g. 36 grams, when using solid propellants as the principle pyrotechnic material. Thus, the inflator weights less and can be made smaller.

Referring now to the sole FIGURE of this application, a preferred embodiment of a hybrid inflator capable of practicing the inventive method is illustrated and generally designated by the reference numeral 10. The inflator 10 includes a case 1, a forward closure 3 and an aft closure 5. Each of the closures 3 and 5 includes a sealing O-ring 7 and a retaining ring 9. The closures 3 and 5 are secured by being sandwiched between the stops 11 in the case 1 and the retaining rings 9. The case 1, forward closure 3 and aft closure 5 form a pressure vessel which houses the compressed oxidizing gas, the liquid fuel and solid propellant as described hereinbelow.

The aft closure 5 includes an igniter 13 which is conventional in the art.

Also arranged within the case 1 is an ignition container 15 which is secured to the aft closure 5 in any conventional manner. The ignition container houses a solid propellant 17 and a piston 19. The piston slidably travels within the ignition container 15. An O-ring 21 surrounds the piston to provide a seal between the solid propellant 17 and the liquid fuel 23 also stored by the ignition container 15.

Downstream of the liquid fuel 23 is an injector plate 25 which includes a plurality of passageways 27 therethrough. The passageways 27 allow the liquid fuel to pass therethrough and to be transformed into liquid jets.

The ignition container also includes a burst disk 29 which is secured in place by the insert 31. The insert 31 also includes an O-ring 33 therearound for sealing purposes. The insert is secured in place by a threaded retainer 35 arranged at the outlet of the ignition container 15.

Surrounding the ignition container 15 is an internal diffuser 37. The diffuser 37 is secured to the aft closure 3 and forms a mixing chamber 39. The mixing chamber 39 is designed to receive the liquid fuel 23 expelled through the injector plate passageways 27. The liquid fuel 23 mixes with and is vaporized and superheated in the mixing chamber 39 by products of combustion from the solid propellant 17 which enter the chamber 39 via a series of radial orifices 41 arranged in the ignition container 15. It should be understood the configuration of the ignition container, including the radial ports 41 and burst disk 29, insert 33 and retainer 35 are exemplary. That is, other configurations could be utilized for positioning or placement of the burst disk or ports for release of the products of combustion. Moreover, these configurations may or may not include the injector plate 25.

The internal diffuser 37 includes an outlet port 43 which allows the liquid fuel and products of combustion to mix with the compressed oxidizing gas 45 stored in the chamber 47 of the pressure vessel formed by the case 1 and forward aft closures 3 and 5, respectively.

In a preferred embodiment, a stagnation plate 49 is arranged adjacent the outlet 43 and spaced therefrom by stops 51. The stagnation plate 49 can be secured in place by the fasteners 53. The stagnation plate 49 deflects the flow of the products of combustion and liquid fuel from the outlet 43 for improved mixing and control of the flame produced when the liquid fuel is ignited by mixing with the compressed oxidizing gas 45.

The forward closure 3 includes a burst disk assembly 55 having a rupturable burst disk 57. The burst disk 57 is designed to rupture when the mix of ignited liquid fuel, compressed oxidizing gas and products of combustion reach a selected pressure. This mixture, i.e. the inflator gas, then exits the inflator 10 via an outlet diffuser 59. The diffuser 59 is secured to the forward closure 3 via the fasteners 60. The diffuser includes a series of radial ports 61 which direct the inflator gas into a device to be inflated. Also provided is another stagnation plate 63 which assists in the radial diffusion of the high pressure gas. The stagnation plate 63 also reduces or eliminates axial thrust for the inflator. The burst disk assembly 55 is similar in design as the burst disk arrangement located at the outlet of the ignition container 15.

The case 1 also includes a fill port 65 and pressure transducer ports 67. The aft closure also has a pressure transducer port 69 which is in communication with the chamber 39. The pressure transducer ports allow monitoring of the pressures in the various chambers.

In operation of the inflator 10, the igniter 13 ignites the solid propellant 17. Ignition of the solid propellant 17 drives the piston 19 to pressurize the liquid fuel 23. The pressurized liquid fuel passes through the orifices 27 in the injector plate 25 and, at a specific pressure, ruptures the burst disk 29. At the same time, products of combustion of the solid propellant 17 exit the ignition container 15 via the radial ports 41. These products of combustion mix with the liquid fuel in the mixing chamber 39 to vaporize and superheat it. The inner walls of the chamber 39 also assist in further atomization of the liquid fuel for improved vaporization and mixing. The vaporized and superheated liquid fuel is then discharged via the outlet 43 into the chamber 45. The liquid fuel is above its autoignition temperature due to the heat generated by combustion of the solid propellant. Consequently, the liquid fuel ignites when in the presence of the compressed oxidizing gas, i.e. air. The ignited inflator gas ruptures the burst disk 57 and exits the inflator via the radial ports 61.

It should be understood that the various components of the inflator 10 are exemplary of the invention. That is, for example, a different type of burst disk assembly or arrangement could be used. Likewise, a differently configured internal diffuser could be utilized to provide the mixing between the liquid fuel and the solid propellant products of combustion.

As such, an invention has been disclosed in terms of preferred embodiments thereof which fulfill each and every one of the objects of the present invention as set forth hereinabove and provides a new and improved hybrid inflator and method of inflating airbags.

Of course, various changes, modifications and alterations from the teachings of the present invention may be contemplated by those skilled in the art without departing from the intended spirit and scope thereof. Accordingly, it is intended that the present invention only be limited by the terms of the appended claims.

We claim:

1. A hybrid inflator comprising:
   a) a pressure vessel forming a chamber;
   b) an igniter mounted to said pressure vessel;
   c) a solid propellant contained within said pressure vessel to be ignited by said igniter;
   d) a liquid fuel stored in said pressure vessel so as to be pressurized by ignition of said solid propellant;
   e) a first mixing chamber within said pressure vessel for receiving said liquid fuel and products of combustion of said solid propellant, said products of combustion vaporizing and superheating said liquid fuel;
   f) a second chamber within said pressure vessel storing a compressed oxidizing gas, said second chamber in communication with said first mixing chamber so that said vaporized and superheating liquid fuel is ignited when contacting said compressed oxidizing gas to form an inflator gas; and
   g) a burst disk-containing outlet in said pressure vessel to release said inflator gas from said second chamber.

2. The hybrid inflator of claim 1 wherein said solid propellant and said liquid fuel are stored in an ignition container within said pressure vessel and are separated by a piston, said piston driven by ignition of said solid propellant so as to pressurize said liquid fuel.

3. The hybrid inflator of claim 2 wherein said ignition container includes an injector plate downstream of said liquid fuel to convert said pressurized liquid fuel into liquid fuel jets for mixing with said products of combustion.

4. The hybrid inflator of claim 2 wherein said ignition container has a rupturable burst disk at an outlet thereof, said rupturable burst disk bursting at a set pressure to release said liquid fuel into said first mixing chamber.

5. The hybrid inflator of claim 3 wherein said ignition container has a rupturable burst disk at an outlet thereof, said rupturable burst disk bursting at a set pressure to release said liquid fuel into said first mixing chamber.

6. The hybrid inflator of claim 2 wherein said ignition container is ported to release said products of combustion into said first mixing chamber.

7. The hybrid inflator of claim 3 wherein said ignition container is ported to release said products of combustion into said first mixing chamber.

8. The hybrid inflator of claim 1 further comprising a stagnation plate arranged at an outlet of said first mixing chamber for improved mixing and flame holding during mixing of said liquid fuel and said products of combustion.

9. The hybrid inflator of claim 1 wherein said burst disk-containing outlet includes a stagnation plate to reduce axial thrust of said inflator gas when exiting said pressure vessel.

10. A method of inflating an inflatable device comprising the steps of:
   a) providing an igniter, a solid propellant, a liquid fuel and a compressed oxidizing gas in a pressure vessel;
   b) igniting said solid propellant with said igniter and pressurizing said liquid fuel;
   c) mixing products of combustion from the ignition of said solid propellant with said liquid fuel for vaporizing and superheating thereof;
   d) igniting said vaporized and superheated liquid fuel by mixing it with said compressed oxidizing gas to form an inflator gas; and
   e) releasing said inflator gas from said pressure vessel for inflating said inflatable device.

11. The method of claim 10 wherein said liquid fuel is a liquid hydrocarbon fuel.

12. The method of claim 11 wherein said liquid hydrocarbon fuel is methanol.

13. The method of claim 10 wherein said compressed oxidizing gas is air.

14. The method of claim 10 wherein said superheated and vaporized liquid fuel is above its autoignition temperature when mixed with said compressed oxidizing gas.

15. The method of claim 10 wherein said liquid fuel is pressurized into liquid jets prior to mixing with said products of combustion.

* * * * *